United States Patent
Lee et al.

(10) Patent No.: US 12,265,813 B2
(45) Date of Patent: Apr. 1, 2025

(54) APPARATUS AND METHOD FOR GENERATING EXECUTABLE IMAGE OF NEURAL NETWORK

(71) Applicant: ELECTRONICS AND TELECOMMUNICATIONS RESEARCH INSTITUTE, Daejeon (KR)

(72) Inventors: Kyung-Hee Lee, Daejeon (KR); Ji-Young Kwak, Daejeon (KR); Seon-Tae Kim, Daejeon (KR); Jae-Bok Park, Daejeon (KR); Ik-Soo Shin, Daejeon (KR); Chang-Sik Cho, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 162 days.

(21) Appl. No.: 18/098,486

(22) Filed: Jan. 18, 2023

(65) Prior Publication Data
US 2023/0342133 A1    Oct. 26, 2023

(30) Foreign Application Priority Data
Apr. 20, 2022    (KR) .................. 10-2022-0048798

(51) Int. Cl.
*G06F 9/44*    (2018.01)
*G06F 8/10*    (2018.01)
(Continued)

(52) U.S. Cl.
CPC .    *G06F 8/63* (2013.01); *G06F 8/10* (2013.01)

(58) Field of Classification Search
CPC .... G06F 8/63; G06F 8/10; G06N 3/08; G06N 3/04; G06N 3/063
See application file for complete search history.

(56) References Cited

U.S. PATENT DOCUMENTS

| 10,380,498 B1 | 8/2019 | Chaoji et al. |
| 2020/0175423 A1 | 6/2020 | Keech et al. |

(Continued)

FOREIGN PATENT DOCUMENTS

| CN | 111797969 A | * 10/2020 | |
| DE | 102021206537 A1 | * 12/2021 | ......... G06F 3/04815 |

OTHER PUBLICATIONS

Xiao Cheng, DeepWukong: Statically Detecting Software Vulnerabilities Using Deep Graph Neural Network. 2021, pp. 1-33. https://dl.acm.org/doi/pdf/10.1145/3436877 (Year: 2021).*
(Continued)

*Primary Examiner* — Mongbao Nguyen
(74) *Attorney, Agent, or Firm* — KILE PARK REED & HOUTTEMAN PLLC

(57) ABSTRACT

An apparatus and method for generating a neural network executable image are disclosed. The apparatus receives user requirements including a default neural network model and training result data for generating a neural network executable image required by a user, checks whether the default neural network model included in the user requirements is capable of being supported in a target system in which the neural network executable image is to be installed, converts the default neural network model into a neural network model executable in the target system, converts the training result data by reconfiguring the data format set of the training result data, and generates a neural network executable image by combining the converted neural network model and the converted training result data.

10 Claims, 16 Drawing Sheets

(51) Int. Cl.
*G06F 8/61* (2018.01)
*G06F 9/445* (2018.01)
*G06F 9/455* (2018.01)

(56) References Cited

U.S. PATENT DOCUMENTS

| | | | |
|---|---|---|---|
| 2020/0210840 A1* | 7/2020 | Darvish Rouhani | G06N 3/082 |
| 2020/0356415 A1 | 11/2020 | Goli | |
| 2021/0158140 A1 | 5/2021 | Cmielowski et al. | |
| 2021/0209514 A1 | 7/2021 | Kim et al. | |
| 2021/0241167 A1 | 8/2021 | Li et al. | |
| 2021/0357749 A1 | 11/2021 | Kim | |
| 2022/0261631 A1* | 8/2022 | Cohen | G06N 20/00 |
| 2023/0161561 A1* | 5/2023 | Ghosh | G06F 8/10 |
| | | | 717/104 |
| 2023/0161568 A1* | 5/2023 | Kim | G06N 20/00 |
| | | | 717/106 |
| 2023/0214190 A1* | 7/2023 | Manivasagam | G06N 7/01 |
| | | | 717/102 |
| 2023/0214638 A1* | 7/2023 | Chang | G06N 3/08 |
| | | | 706/41 |

OTHER PUBLICATIONS

Leon Hielscher, Platform Generation for Edge AI Devices with Custom Hardware Accelerators, 2021, pp. 1-8. https://ieeexplore.ieee.org/stamp/stamp.jsp?tp=&arnumber=9557519 (Year: 2021).*
Shivam Mhaskar, Pivot based Transfer Learning for Neural Machine Translation: CFILT IITB @ WMT 2021 Triangular MT,2021, pp. 1-5. https://aclanthology.org/2021.wmt-1.39.pdf (Year: 2021).*
Hongyu Kuang, Automated Data-Processing Function Identification Using Deep Neural Network, 2020, pp. 1-13. https://ieeexplore.ieee.org/stamp/stamp.jsp?tp=&arnumber=9039667 (Year: 2020).*
Xing Hu, Practical Attacks on Deep Neural Networks by Memory Trojaning, 2021, pp. 1-14. https://ieeexplore.ieee.org/stamp/stamp.jsp?tp=&arnumber=9096397 (Year: 2021).*
Pardeshi et al. (DE 102021206537 A1), 2021, pp. 1-76. (Year: 2021).*
Li et al. (CN 111797969 A), 2020, p. 11-26. (Year: 2020).*

* cited by examiner

APPARATUS AND METHOD FOR GENERATING EXECUTABLE IMAGE OF NEURAL NETWORK

CROSS REFERENCE TO RELATED APPLICATION

This application claims the benefit of Korean Patent Application No. 10-2022-0048798, filed Apr. 20, 2022, which is hereby incorporated by reference in its entirety into this application.

BACKGROUND OF THE INVENTION

1. Technical Field

The present disclosure relates generally to Artificial Intelligence (AI) technology based on a neural network, and more particularly to technology for generating a neural network executable image customized for a target system.

2. Description of the Related Art

Hardware to run for training and inference of a neural network is configured such that a neural network execution accelerator, such as a Graphics Processing Unit (GPU), is installed when necessary, and an operating system (OS), training/inference engines, system software, and the like are installed. Additionally, when it is intended to reduce the size of a neural network model, a lightening module for performing data quantization is installed in the hardware.

In general neural network training and inference processes, training/test data is input to the hardware environment in which the above-mentioned elements are installed, a neural network graph is configured, and a training process for outputting training result data from each node of the neural network graph is performed first.

In a subsequent installation execution process, when a developer determines that it is necessary to lighten the neural network, the volume of the neural network graph and the training result data is reduced using the lightening module on the hardware. In this process, the generated neural network graph and the training result data are executed in the same type of engine as the engine used for training or in the same neural network engine.

In the general neural network installation execution process described above, the neural network engine used for training of the neural network is not the same as the neural network engine to be used for inference, so N-to-N(N:N) format conversion for the respective types of training engines and inference engines may be performed.

Here, mutual format conversion may be generally used when a neural network graph representation or the format for storing training result data is not uniform. In this case, the number of conversion modules for respective formats increases in proportion to the number of format types.

When lightening is performed through quantization of training result data of a neural network, quantization-based conversion between data formats, such as floating-point 64, floating-point 32, integer 32, and the like, is performed, in which case the number of conversion modules for respective formats increases in proportion to the number of format types.

Also, when inference is performed, if the sizes of the neural network graph and training data exceed the size of available memory of the system in which the neural network is to be executed, execution may be impossible.

With regard to the above-mentioned problems, such as separately supporting a training engine and an inference engine, data conversion based on quantization, and checking available memory at the time of executing a neural network, conventional methods have a problem in which implementation and use of each neural network engine and a converter for each data format, memory checking by a user, generation of a lightweight neural network executable image, and the like have to be manually performed.

Meanwhile, U.S. Pat. No. 10,380,498, titled "Platform services to enable one-click execution of the end-to-end sequence of modeling steps" discloses an apparatus and method for generating a learning model by selecting features and parameters based on a similarity score that is determined by comparing a model requirement of a user with previously stored model requirements of multiple users.

SUMMARY OF THE INVENTION

An object of the present disclosure is to lighten a neural network model and to solve the problem of complexity in generation of a neural network executable image.

Another object of the present disclosure is to solve a problem of separately supporting a training engine and an inference engine of a neural network model, a problem of data conversion based on quantization, and a problem in which it is required to check available memory when a neural network is executed.

A further object of the present disclosure is to support implementation and use of a neural network engine and a converter for each data format, checking of memory by a user, and generation of a lightweight neural-network executable image.

In order to accomplish the above objects, an apparatus for generating an executable image of a neural network according to an embodiment of the present disclosure includes one or more processors and executable memory for storing at least one program executed by the one or more processors. The at least one program receives user requirements including a default neural network model and training result data for generating a neural network executable image required by a user, checks whether the default neural network model included in the user requirements is capable of being supported in a target system in which the neural network executable image is to be installed, converts the default neural network model into a neural network model executable in the target system, converts the training result data by reconfiguring the data format set of the training result data, and generates a neural network executable image by combining the converted neural network model and the converted training result data.

Here, in order to check whether the default neural network model is capable of being supported in the target system. the at least one program may check whether a neural network model conversion plugin that supports the neural network graph representation format of the default neural network model and the data format of the training result data is present.

Here, the at least one program may check whether an accelerator type included in the user requirements is present in an accelerator library and identify execution functions used by an inference engine included in the user requirements, thereby checking whether the default neural network model is capable of being supported in the target system.

Here, the at least one program may select a pivot model for neural network model conversion and form a neural network model conversion plugin in which a function for two-way conversion between the selected pivot model and each neural network model is implemented for each neural network model.

Here, the at least one program may convert the default neural network model by checking whether the selected pivot model is the same type of model as a neural network model for inference engine in the target system.

Here, the at least one program may extract a neural network function used in the default neural network model, identify an additional neural network function called by the extracted neural network function, and add the additional neural network function as a neural network function for inference engine.

Here, the at least one program may select a pivot data format for data conversion based on quantization and quantize the data value of the training result data using the pivot data format, thereby reconfiguring the data format set of the training result data.

Here, the at least one program may check whether the size of the neural network executable image is equal to or less than the size of storage of the target system and perform a performance test for checking whether performance of the neural network executable image satisfies required performance of the user requirements.

Here, the at least one program may execute the neural network executable image using a test data set included in the user requirements and perform a performance test for analyzing inference accuracy and a data-processing rate of a neural network executed for the test data set.

Also, in order to accomplish the above objects, a method for generating an executable image of a neural network, performed by an apparatus for generating an executable image of a neural network, according to an embodiment of the present disclosure includes receiving user requirements including a default neural network model and training result data for generating a neural network executable image required by a user, checking whether the default neural network model included in the user requirements is capable of being supported in a target system in which the neural network executable image is to be installed, converting the default neural network model into a neural network model executable in the target system, converting the training result data by reconfiguring the data format set of the training result data, and generating a neural network executable image by combining the converted neural network model and the converted training result data.

Here, checking whether the default neural network model is capable of being supported in the target system may comprise checking whether a neural network model conversion plugin that supports the neural network graph representation format of the default neural network model and the data format of the training result data is present in order to check whether the default neural network model is capable of being supported in the target system.

Here, checking whether the default neural network model is capable of being supported in the target system may comprise checking whether an accelerator type included in the user requirements is present in an accelerator library and identifying an execution function used by an inference engine included in the user requirements, thereby checking whether the default neural network model is capable of being supported in the target system.

Here, converting the default neural network model may comprise selecting a pivot model for neural network model conversion and forming a neural network model conversion plugin in which a function for two-way conversion between the selected pivot model and each neural network model is implemented for each neural network model.

Here, converting the default neural network model may comprise converting the default neural network model by checking whether the selected pivot model is the same type of model as a neural network model for inference engine in the target system.

Here, converting the default neural network model may comprise extracting a neural network function used in the default neural network model, identifying an additional neural network function called by the extracted neural network function, and adding the additional neural network function as a neural network function for inference engine.

Here, converting the training result data may comprise selecting a pivot data format for data conversion based on quantization and quantizing the data value of the training result data using the pivot data format, thereby reconfiguring the data format set of the training result data.

Here, generating the neural network executable image may comprise checking whether the size of the neural network executable image is equal to or less than the size of storage of the target system and performing a performance test for checking whether performance of the neural network executable image satisfies required performance of the user requirements.

Here, generating the neural network executable image may comprise executing the neural network executable image using a test data set included in the user requirements and performing a performance test for analyzing inference accuracy and a data-processing rate of a neural network executed for the test data set.

BRIEF DESCRIPTION OF THE DRAWINGS

The above and other objects, features, and advantages of the present disclosure will be more clearly understood from the following detailed description taken in conjunction with the accompanying drawings, in which.

DESCRIPTION OF THE PREFERRED EMBODIMENTS

Figure 1:
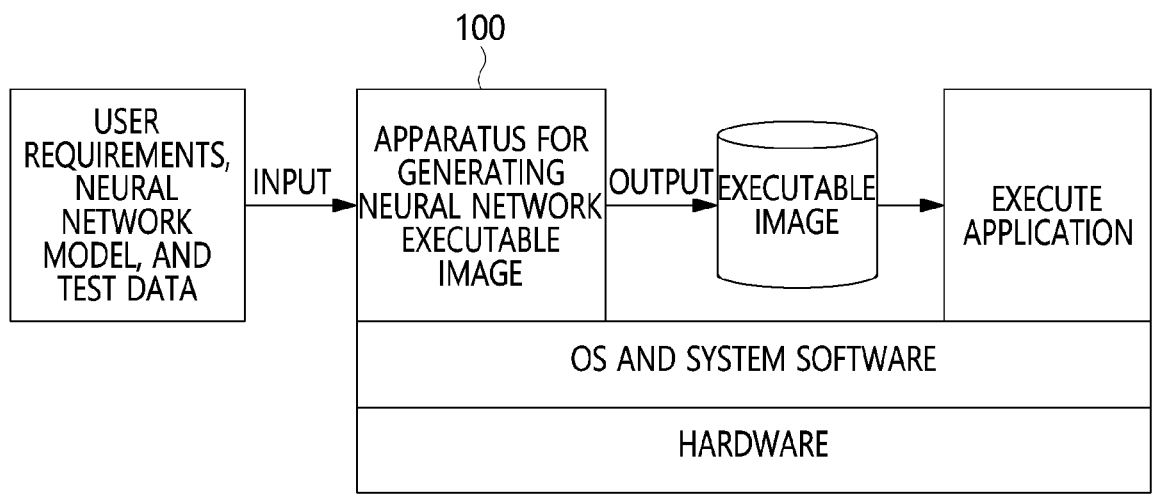
FIG. 1 is a view illustrating a system for generating an executable image of a neural network according to an embodiment of the present disclosure.

The present disclosure will be described in detail below with reference to the accompanying drawings. Repeated descriptions and descriptions of known functions and configurations that have been deemed to unnecessarily obscure the gist of the present disclosure will be omitted below. The embodiments of the present disclosure are intended to fully describe the present disclosure to a person having ordinary knowledge in the art to which the present disclosure pertains. Accordingly, the shapes, sizes, etc. of components in the drawings may be exaggerated in order to make the description clearer.

Throughout this specification, the terms "comprises" and/or "comprising" and "includes" and/or "including" specify the presence of stated elements but do not preclude the presence or addition of one or more other elements unless otherwise specified.

Hereinafter, a preferred embodiment of the present disclosure will be described in detail with reference to the accompanying drawings.

Figure 2:
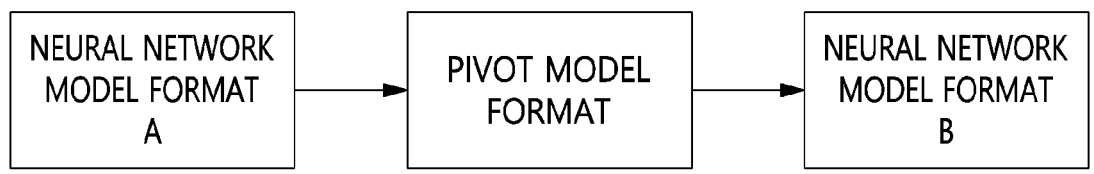
FIG. 2 is a view illustrating a pivot model format converter for a neural network model format according to an embodiment of the present disclosure.

FIG. 1 is a view illustrating a system for generating an executable image of a neural network according to an embodiment of the present disclosure. FIG. 2 is a view illustrating a pivot model format converter for a neural network model format according to an embodiment of the present disclosure.

Referring to FIG. 1, a system for generating an executable image of a neural network according to an embodiment of the present disclosure may include an apparatus 100 for generating an executable image of a neural network on hardware such as a computer device.

The apparatus 100 for generating an executable image of a neural network may generate an executable image of a neural network by receiving user requirements, a neural network model, and test data, and may execute the executable image in an application.

The apparatus 100 for generating an executable image of a neural network may automatically generate an executable image of a neural network to be customized for a target system by receiving a trained neural network model, a test data set, and user requirements.

The target system may be an environment in which an operating system and system software are installed.

The trained neural network model includes a neural network graph structure and training result data. The test data set includes data that is used for a neural network operation test. The user requirements include the type of a neural network accelerator installed in the target system, the type of a neural network inference engine installed therein, a storage size, which is the size of available memory at the time of executing a neural network, and information about required performance, such as inference accuracy, a data-processing rate, and the like.

With regard to lightening of training result data, the system for generating an executable image of a neural network according to an embodiment of the present disclosure selects a pivot data format for data conversion based on quantization and provides quantization modules based on the pivot data format in the form of plugins, thereby supporting optimal lightening through application of multiple types of quantization algorithms.

Also, the system for generating an executable image of a neural network according to an embodiment of the present disclosure may check in advance whether a neural network is capable of being executed in a target environment by measuring not only the size of a neural network model but also the size of executable code including modules required for inference in order to check available memory when the neural network is executed.

Also, the system for generating an executable image of a neural network according to an embodiment of the present disclosure may lighten an inference engine as well as a neural network model in order to reduce memory usage when a neural network is executed.

Also, the system for generating an executable image of a neural network according to an embodiment of the present disclosure may configure neural network functions in an inference engine and libraries used by the neural network functions in the form of components and build the inference engine using only the neural network functions and libraries that are actually used by the neural network model.

Also, in order to automatically generate an executable image of a neural network, the system for generating an executable image of a neural network according to an embodiment of the present disclosure may receive an accelerator type, an inference engine type, a storage size, required performance, and the like required by a user as input, and may provide a function of automatically checking whether the neural network is capable of operating in the target system, as required by the user.

Referring to FIG. 2, it can be seen that the system for generating an executable image of a neural network according to an embodiment of the present disclosure uses a pivot model format converter for providing compatibility of the neural network model format used by a neural network execution engine in order to separately support a training engine and an inference engine.

The neural network model format may include a neural network graph representation format and a training result data format.

As a method for converting a neural network model format, there is a method for building a 1:1 converter for each neural network model format used by a neural network engine, but this method has a disadvantage in that converters for mutual conversion are required for respective formats. The present disclosure selects a pivot model format and provides a converter for each neural network model format based thereon, thereby simplifying a model conversion structure.

Figure 3:
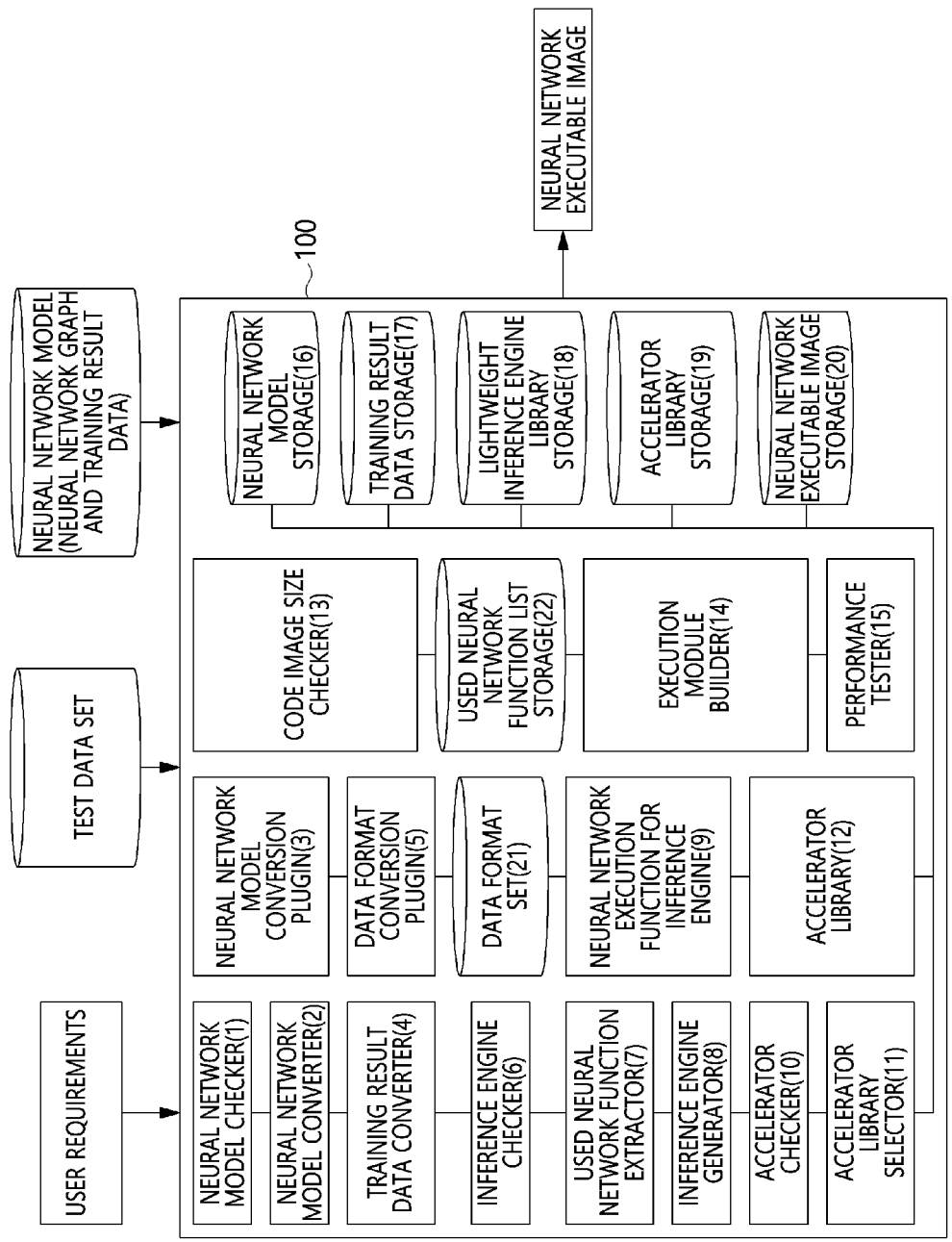
FIG. 3 is a block diagram illustrating an apparatus for generating an executable image of a neural network according to an embodiment of the present disclosure.

FIG. 3 is a block diagram illustrating an apparatus for generating an executable image of a neural network according to an embodiment of the present disclosure.

Referring to FIG. 3, an apparatus 100 for generating an executable image of a neural network according to an embodiment of the present disclosure may include a neural network model checker 1, a neural network model converter 2, a neural network model conversion plugin 3, a training result data converter 4, a data format conversion plugin 5, an inference engine checker 6, a used neural network function extractor 7, an inference engine generator 8, an accelerator checker 10, an accelerator library selector 11, an accelerator library 12, a code image size checker 13, an execution module builder 14, a performance tester 15, neural network model storage 16, training result data storage 17, lightweight inference engine library storage 18, accelerator library storage 19, neural network executable image storage 20, a data format set 21, and used neural network function list storage 22.

The neural network model checker 1 may check whether a neural network model, configured with an input neural network graph and training result data, is capable of being executed. Here, the neural network graph may correspond to information that represents the graph structure of the neural network model.

The neural network model converter 2 may convert the formats of an input neural network graph and training result data into formats that are recognizable in the inference engine of a target system.

The neural network model conversion plugin 3 may perform mutual conversion based on a pivot neural network model representation format for conversion between formats used for respective inference engines.

The training result data converter 4 may perform the function of converting the data format of training result data in a neural network model.

Here, the training result data converter 4 may perform the function of quantizing a data value of a floating-point format, an integer format, a 64-bit format, a 16-bit format, or the like.

Here, the training result data converter 4 may select a data representation format having the highest precision in a corresponding system, e.g., a 64-bit floating-point format, as a pivot format and store the same as a pivot format name.

The data format conversion plugin 5 may perform mutual conversion between data formats.

Here, the data format conversion plugin 5 may perform two-way conversion between the pivot format defined in the training result data converter 4 and each data format.

The inference engine checker 6 may check whether the inference engine received as user requirements input by a user is capable of being applied to a target system.

The used neural network function extractor 7 may analyze which neural network functions are used for execution of a neural network graph by analyzing the neural network graph in the neural network model input by a user.

The inference engine generator 8 forms an inference engine using only neural network functions that correspond to the neural network functions used in a neural network model, thereby lightening the inference engine. Neural network execution functions 9 for inference engine include neural network execution functions that are available in a target system.

The accelerator checker 10 may check whether the accelerator required by a user is capable of being used in a target system.

The accelerator library selector 11 may load an accelerator library for fast execution of the neural network functions generated by the inference engine generator 8.

The accelerator library 12 stores a set of accelerator libraries available in a system.

The code image size checker 13 may check whether the size of the executable image, generated based on a neural network model, a formed inference engine, and an accelerator library, meets the requirements of a user.

The execution module builder 14 may generate an executable image based on a neural network model, a formed inference engine, and an accelerator library.

The performance tester 15 executes an executable image for test, inputs the test data set input by a user, and measures a data-processing rate and the inference accuracy of an executed neural network, thereby checking whether the performance required by a user is satisfied.

The neural network model storage 16 is storage for temporarily storing a result of conversion of a neural network graph.

The training result data storage 17 is storage for temporarily storing converted training result data.

The lightweight inference engine library storage 18 is storage for temporarily storing an inference engine configured with only neural network functions used in a neural network model.

The accelerator library storage 19 is storage for temporarily storing the accelerator library used in a target system.

The neural network executable image storage 20 is storage for temporarily storing the executable image generated by the execution module builder 14.

The data format set 21 is storage that stores a list of plugins for quantizing training result data.

The used neural network function list storage 22 is storage that stores a list of neural network functions used in a neural network model.

Figure 4:
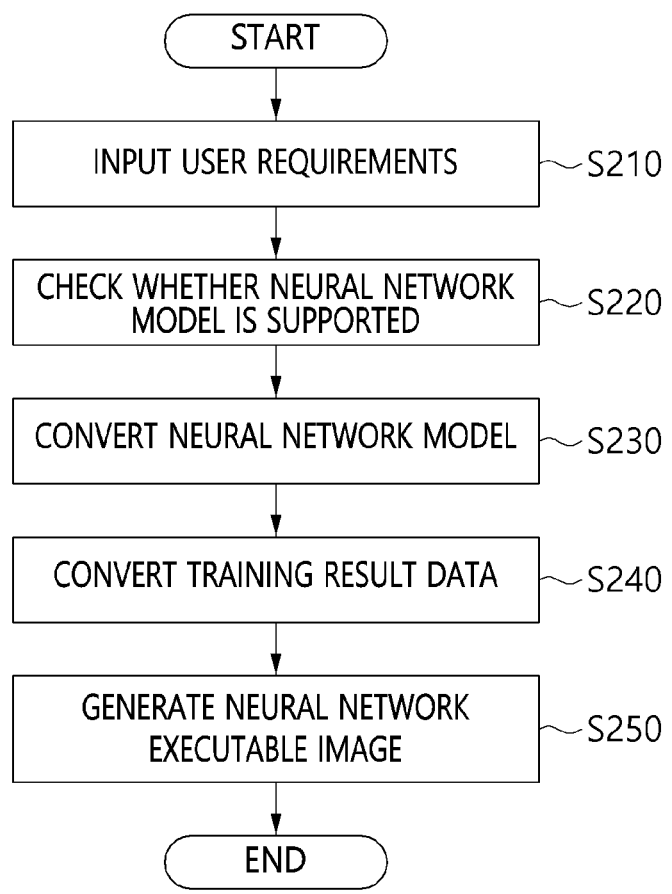
FIG. 4 is a flowchart illustrating a method for generating an executable image of a neural network according to an embodiment of the present disclosure.

FIG. 4 is a flowchart illustrating a method for generating an executable image of a neural network according to an embodiment of the present disclosure.

Referring to FIG. 4, in the method for generating an executable image of a neural network according to an embodiment of the present disclosure, first, user requirements may be input at step S210.

That is, at step S210, user requirements including a default neural network model for generating a neural network executable image required by a user may be input.

The user requirements may include a neural network model, including a neural network graph structure and training result data, a test data set, an accelerator type, an inference engine type, the size of storage of a target system, required performance, and the like.

The required performance of the user requirements may include a data-processing rate and inference accuracy of an executed neural network.

Here, at step S210, initialization may be performed by deleting content in the neural network model storage 16, the training result data storage 17, the lightweight inference engine library storage 18, the accelerator library storage 19, the neural network executable image storage 20, the data format set 21, and the used neural network function list storage 22.

Also, in the method for generating an executable image of a neural network according to an embodiment of the present disclosure, whether the user requirements can be supported may be checked at step S220.

That is, at step S220, whether the information included in the user requirements can be supported in the target system in which the neural network executable image is to be installed may be checked.

Figure 5:
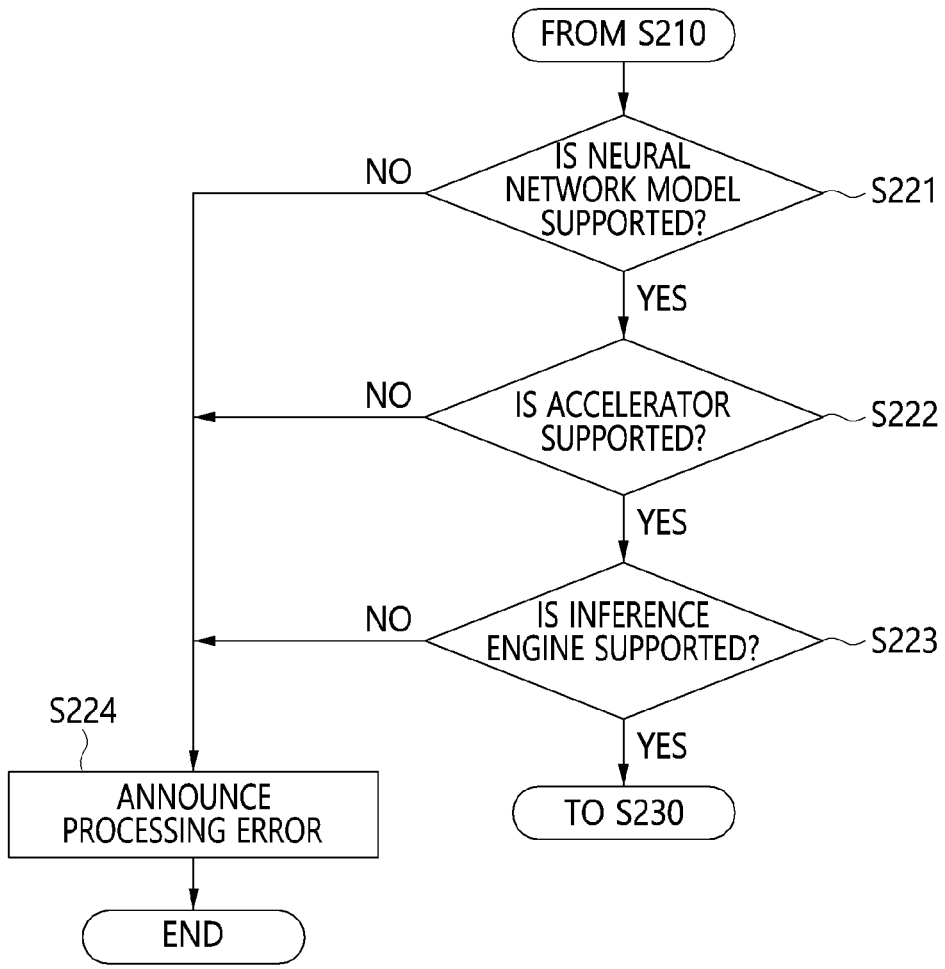
FIG. 5 is a flowchart illustrating in detail an example of the step of determining whether a neural network model is supported, illustrated in FIG. 4.

FIG. 5 is a flowchart illustrating in detail an example of the step of determining whether a neural network model can be supported, illustrated in FIG. 4.

Referring to FIG. 5, whether the default neural network model included in the user requirements can be supported in the target system in which the neural network executable image is to be installed may be checked at step S221.

Here, step S221 is performed by the neural network model checker 1. The neural network model checker 1 may check whether a neural network model conversion plugin 3 that supports the neural network graph representation format of the input default neural network model and the data format of the training result data is present, and may return 'yes' when a neural network model conversion plugin for the corresponding formats is present, but return 'no' when a neural network model conversion plugin for the corresponding formats is not present.

Then, whether an accelerator corresponding to the accelerator type included in the user requirements can be supported in the target system may be checked at step S222.

Here, step S222 is performed by the accelerator checker 10. The accelerator checker 10 may check whether an accelerator corresponding to the accelerator type input by the user is present in the accelerator library 12, and may return 'yes' when the accelerator corresponding to the accelerator type can be supported, but return 'no' when the accelerator cannot be supported.

Then, whether the inference engine included in the user requirements can be supported in the target system may be checked at step S223.

Here, step S223 is performed by the inference engine checker 6. In order to check whether the type of an inference engine input as the user requirements can be supported in the target system, the inference engine checker 6 may check whether the input inference engine type is the same type of engine as the inference engine included in the neural network execution functions 9 for inference engine, and may return 'yes' when the inference engine type can be supported, but return 'no' when the inference engine type cannot be supported.

Here, when it is determined at steps S221 to S223 that the user requirements cannot be supported in the target system, the user is notified of an processing error at step S224, after which the process may be terminated.

Also, in the method for generating an executable image of a neural network according to an embodiment of the present disclosure, the neural network model may be converted at step S230.

That is, the default neural network model may be converted into a neural network model executable in the target system at step S230.

Figure 6:
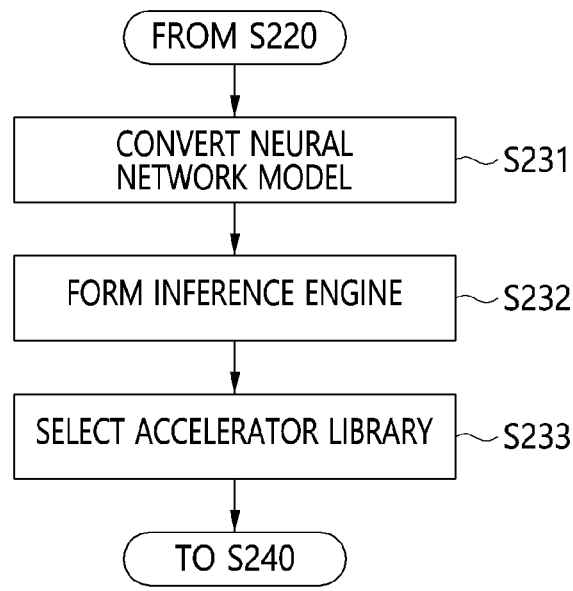
FIG. 6 is a flowchart illustrating in detail an example of the step of converting a neural network model, illustrated in FIG. 4.

FIG. 6 is a flowchart illustrating in detail an example of the step of converting a neural network model, illustrated in FIG. 4.

Referring to FIG. 6, the default neural network model may be converted into a neural network model executable in the target system at step S231.

Figure 7:
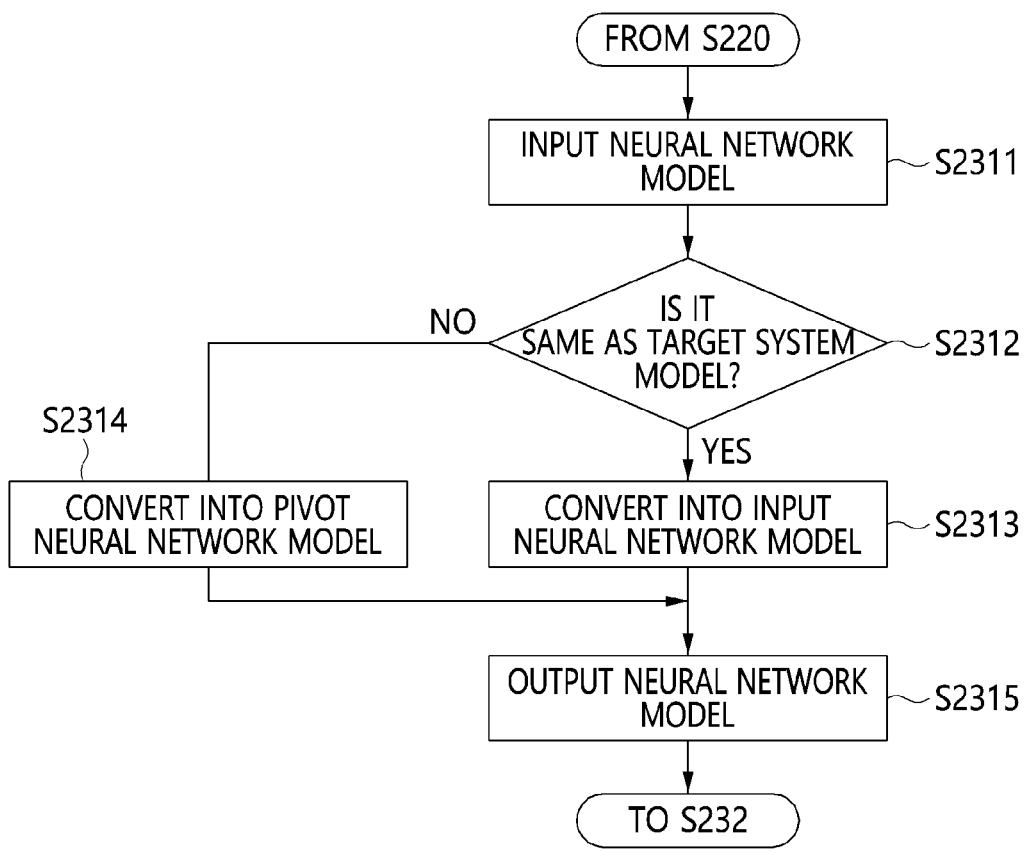
FIG. 7 is a flowchart illustrating in detail an example of the step of converting a neural network model, illustrated in FIG. 6.

FIG. 7 is a flowchart illustrating in detail an example of the neural network model conversion step illustrated in FIG. 6.

Referring to FIG. 7, the default neural network model may be input at step S2311.

Here, at step S2311, a pivot model is selected for conversion of the neural network model, and a function for two-way conversion between the selected pivot model and each neural network model is implemented for each neural network model, whereby a neural network model conversion plugin 3 may be formed.

Here, at step S2312, whether the selected pivot model is the same type of model as the neural network model for inference engine in the target system may be checked.

Here, when it is determined at step S2312 that the pivot model is the same as the neural network model of the target system, the neural network model conversion plugin corresponding to the input default neural network model is called, whereby the neural network model may be converted at step S2313.

Here, when it is determined at step S2312 that the pivot model is not the same as the neural network model of the target system, conversion into the format of the pivot model is performed by calling the neural network model conversion plugin corresponding to the input default neural network model, and then the format of the pivot model may be converted into the format of the neural network model for inference engine in the target system at step S2314.

The reason for using the pivot model is for supporting the diversity of target systems and inference engines and for improving portability.

Here, at step S2315, the converted neural network model may be output.

Figure 8:
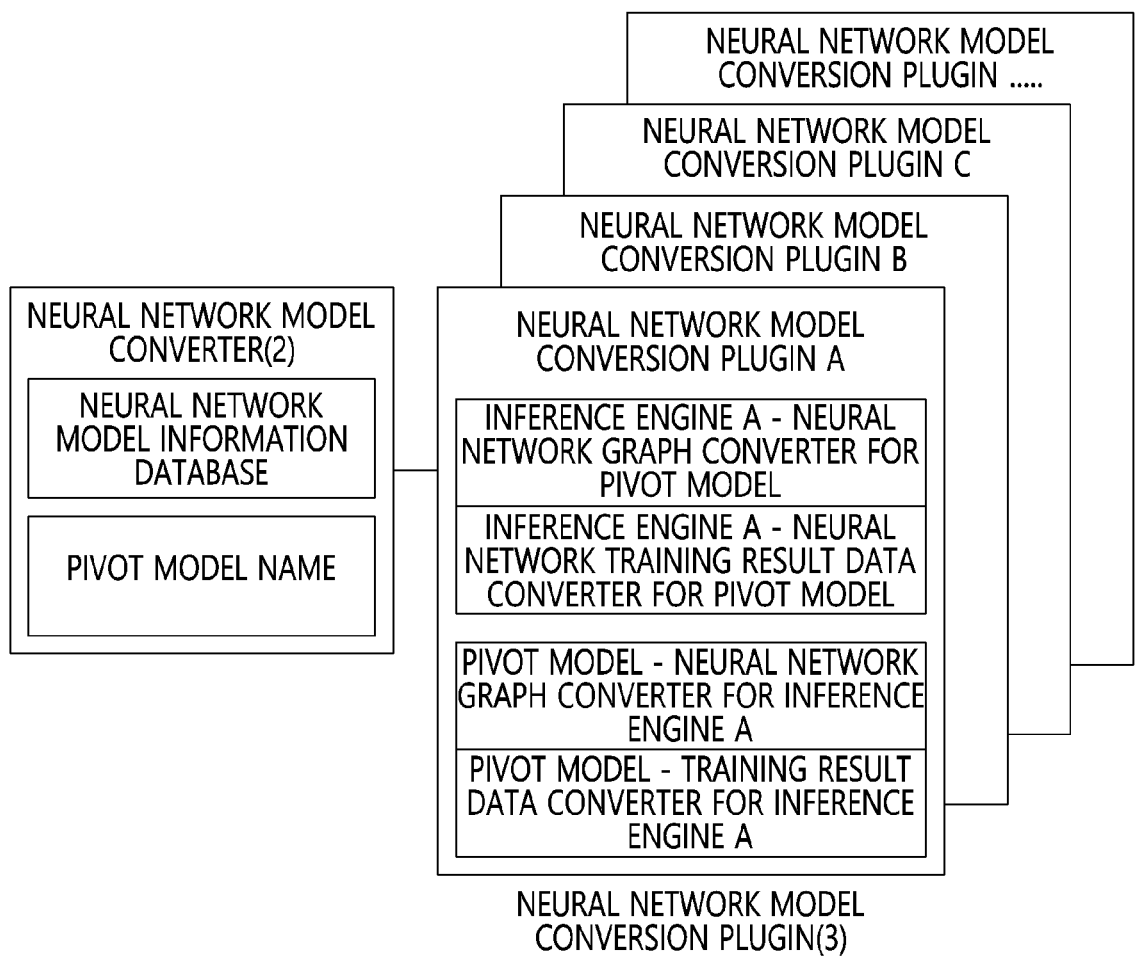
FIG. 8 is a block diagram illustrating a neural network model converter and a neural network model conversion plugin according to an embodiment of the present disclosure.

FIG. 8 is a block diagram illustrating a neural network model converter and a neural network model conversion plugin according to an embodiment of the present disclosure.

Referring to FIG. 8, the neural network model conversion plugins 3 may include a function for converting a neural network graph and a function for converting training result data.

Figure 9:
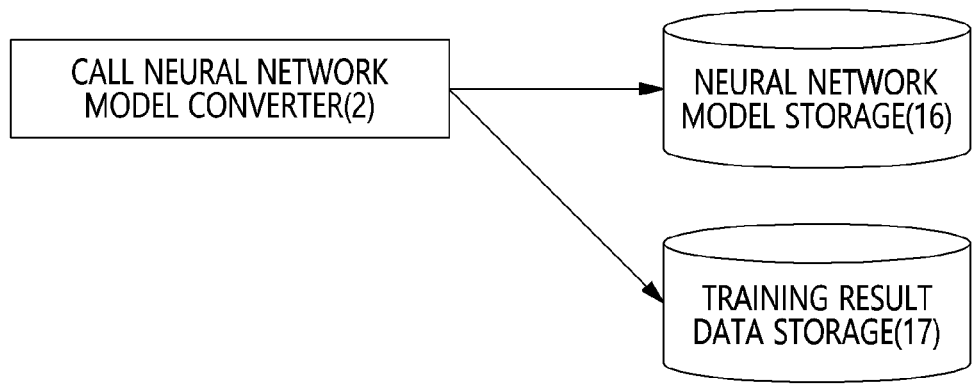
FIG. 9 is a view illustrating the process of storing neural network graph information of a converted neural network model according to an embodiment of the present disclosure.

FIG. 9 is a view illustrating the process of storing the neural network graph information of a converted neural network model according to an embodiment of the present disclosure.

Referring to FIG. 9, the neural network model converter 2 may store the neural network graph information of the converted neural network model in the neural network model storage 16 and store the training result data in the training result data storage 17.

Here, the neural network model converter 2 may store a list comprising the respective neural network model conversion plugins in the neural network model storage 16 and store the type of the pivot neural network model as the pivot model name to be used for neural network conversion.

At step S232, an inference engine based on the user requirements may be formed.

Here, at step S232, neural network functions used in the default neural network model are extracted, and additional neural network functions called by the extracted neural network functions may be identified and added as neural network functions for inference engine.

Figure 10:
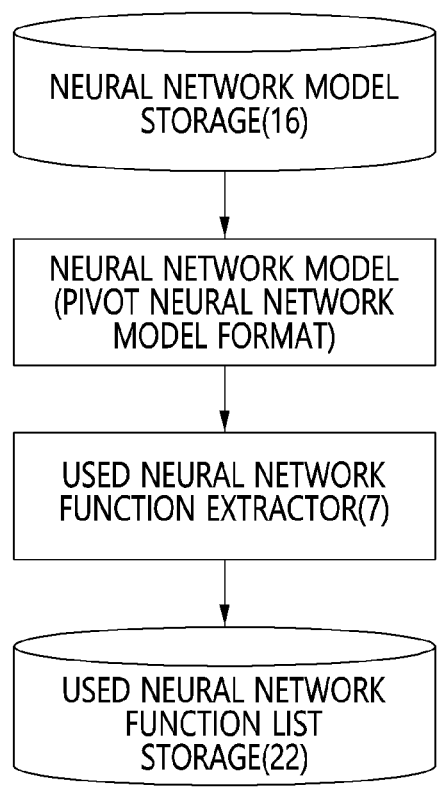
FIG. 10 is a view illustrating the process of extracting a neural network function list in a neural network model according to an embodiment of the present disclosure.

FIG. 10 is a view illustrating the process of extracting a list of neural network functions in a neural network model according to an embodiment of the present disclosure.

Referring to FIG. 10, the neural network model converter 2 may first extract neural network functions used in the input default neural network model using the used neural network function extractor 7 in order to generate an inference engine, and may store a list comprising the functions in the used neural network function list storage 22.

Here, it can be seen that the neural network functions used in the input neural network model are extracted using the used neural network function extractor 7 and that a list comprising the functions is stored in the used neural network function list storage 22.

Figure 11:
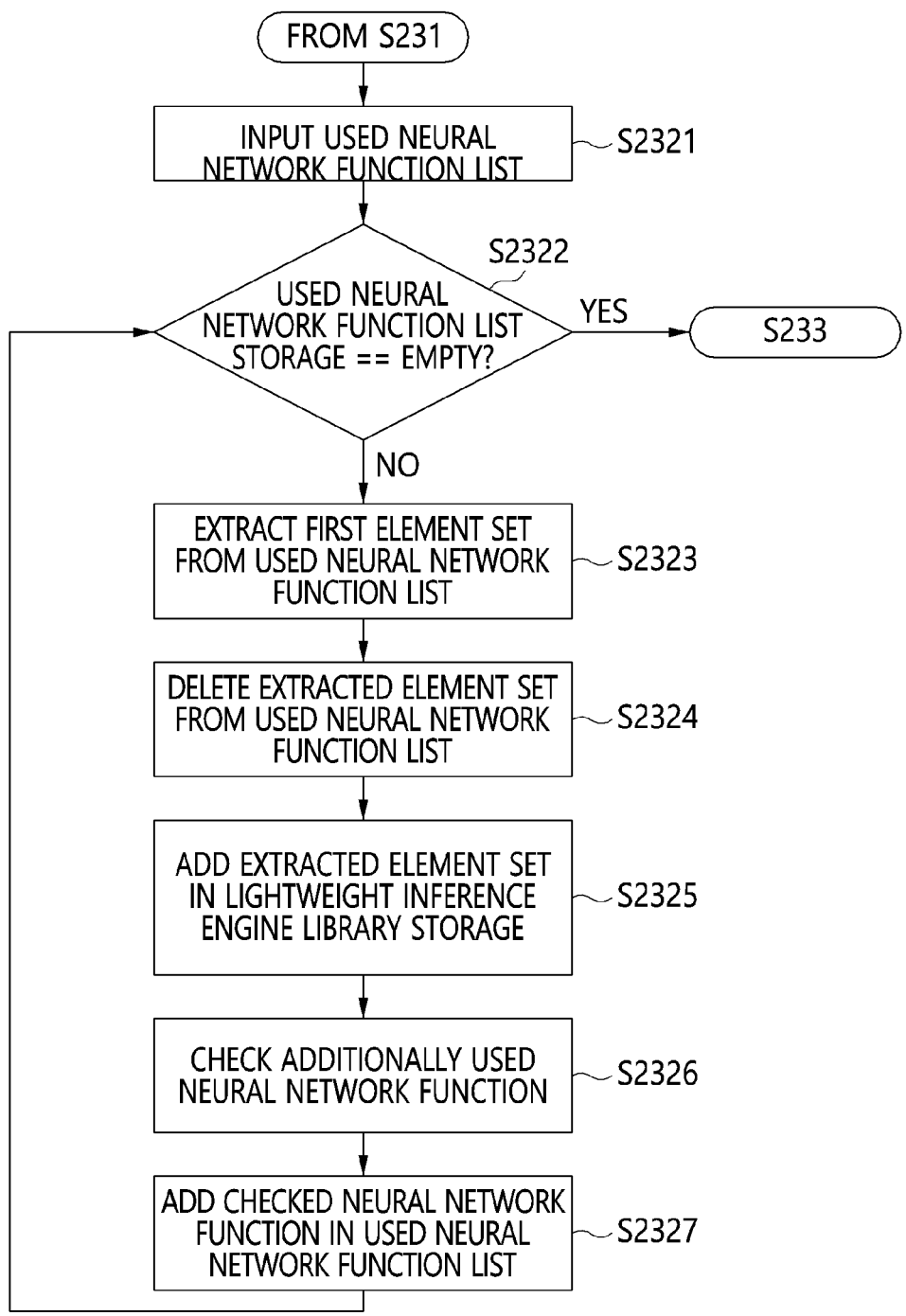
FIG. 11 is a flowchart illustrating in detail an example of the step of building an inference engine, illustrated in FIG. 6.

FIG. 11 is a flowchart illustrating in detail an example of the step of building an inference engine, illustrated in FIG. 6.

Referring to FIG. 11, the neural network function list may be input from the used neural network function list storage 22 at step S2321.

Here, whether the neural network function list is empty is checked at step S2322. When the neural network function list is empty, step S233 is performed, whereas when the neural network function list is not empty, the first element set may be extracted from the used neural network function list storage 22 at step S2323.

Here, the extracted first element set may be deleted from the used neural network function list storage 22 at step S2324.

Here, at step S2325, the neural network function corresponding to the extracted first element set may be extracted from neural network execution functions and added in the lightweight inference engine library storage 18.

Here, at step S2326, whether the extracted neural network function calls an additional neural network function may be checked.

Here, when it is determined that the extracted neural network function calls an additional neural network function, whether the additional neural network is added in the lightweight inference engine library storage 18 is checked. When the additional neural network function is not added, the additional neural network function may be added in the used neural network function list storage 22 at step S2327.

Here, after step S2327, the step (S2322) of checking whether the used neural network function list storage 22 is empty may be performed, and when it is determined that the used neural network function list storage 22 is empty, step S233 may be performed.

Figure 12:
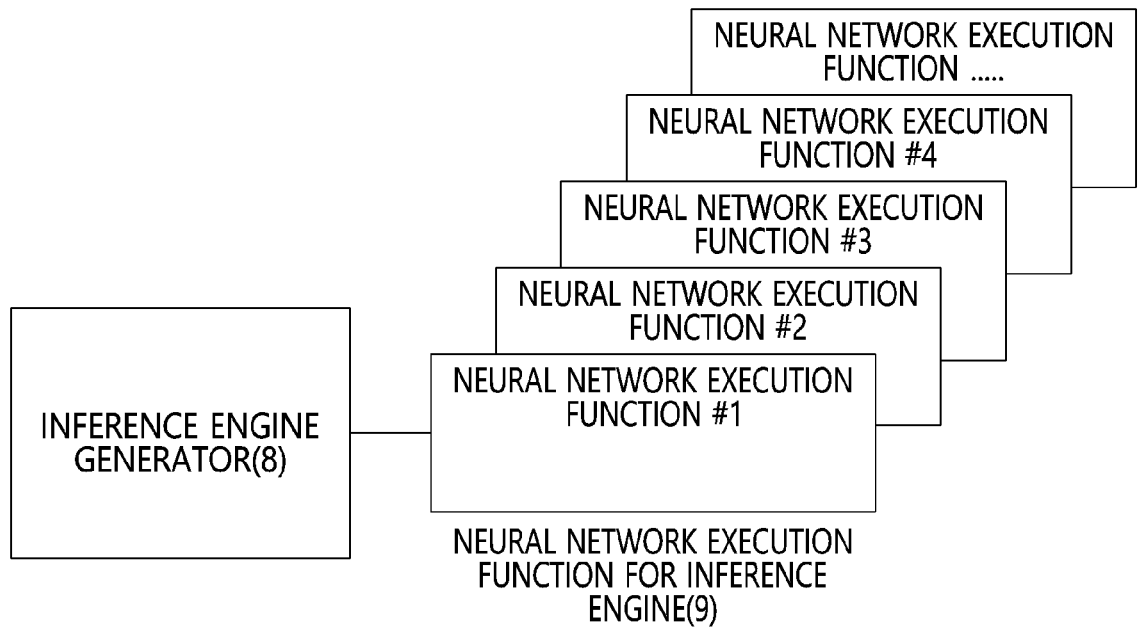
FIG. 12 is a view illustrating the process of building an inference engine according to an embodiment of the present disclosure.

FIG. 12 is a view illustrating the process of forming an inference engine according to an embodiment of the present disclosure.

Referring to FIG. 12, it can be seen that the inference engine generator 8 interworks with the neural network execution functions 9 for inference engine. Here, it can be seen that the neural network execution functions 9 for inference engine are divided into individual functions corresponding to neural network execution functions used for neural network inference in the target system.

At step S233, an accelerator library for supporting the accelerator in the user requirements may be selected.

Here, the accelerator library corresponding to the accelerator type input as the user requirements may be selected from the accelerator library 12 at step S233.

Figure 13:
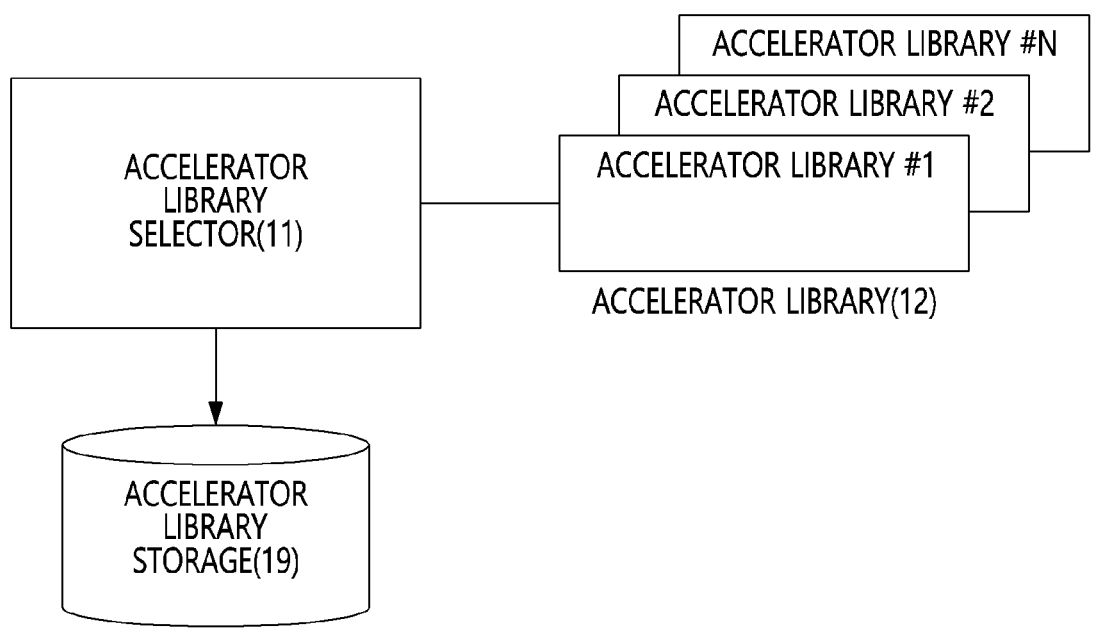
FIG. 13 is a view illustrating the process of selecting an accelerator library according to an embodiment of the present disclosure.

FIG. 13 is a view illustrating the process of selecting an accelerator library according to an embodiment of the present disclosure.

Referring to FIG. 13, step S233 is performed by the accelerator library selector 11, and it can be seen that the accelerator library corresponding to the accelerator type input as the user requirement is selected from the accelerator library 12 and stored in the accelerator library storage 19. When the implementation of the present disclosure is generated, the accelerator library 12 may be installed together by a developer.

Also, in the method for generating an executable image of a neural network according to an embodiment of the present disclosure, a data format set may be reconfigured at step S240.

That is, at step S240, the data format set of the training result data is reconfigured, whereby the training result data may be converted.

Figure 14:
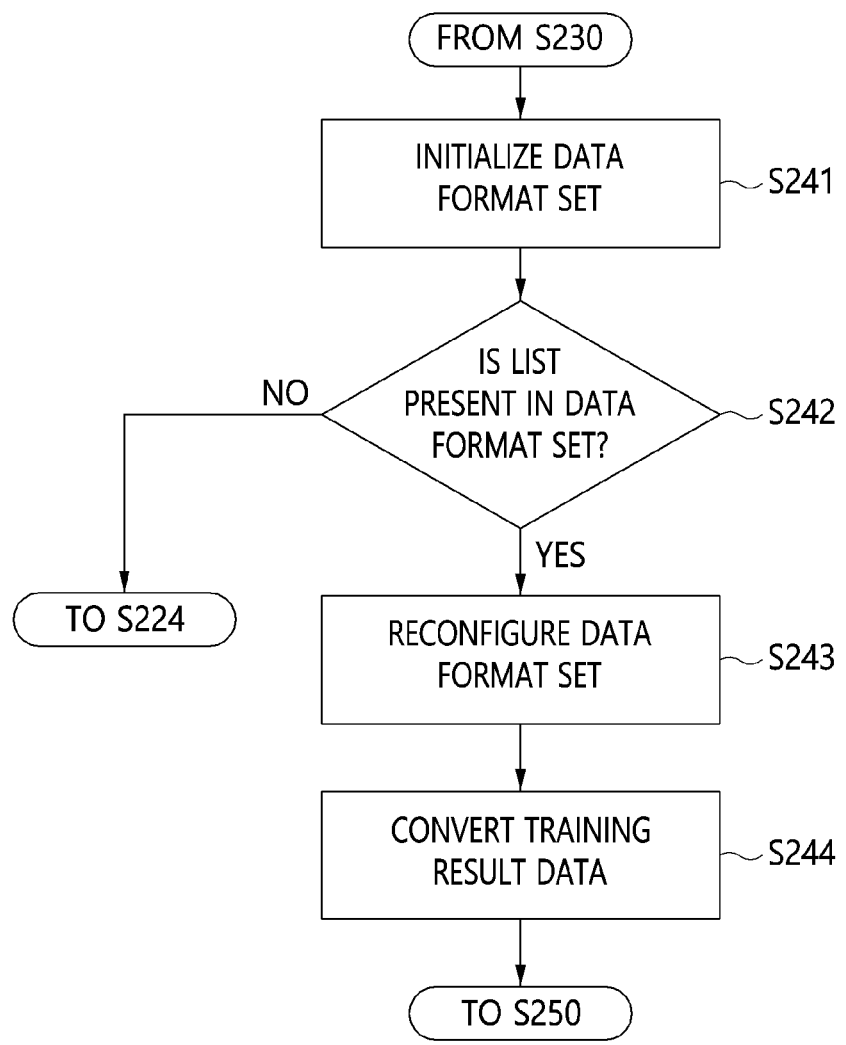
FIG. 14 is a flowchart illustrating in detail an example of the step of reconfiguring a data format set, illustrated in FIG. 4.

FIG. 14 is a flowchart illustrating in detail an example of the step of reconfiguring a data format set, illustrated in FIG. 4.

Referring to FIG. 14, a list of data format conversion plugins 5 may be stored in the data format set 21 at step S241. The data format set 21 may store only a list of convertible data format types included in the data format conversion plugin 5 connected with the training result data converter 4.

At step S242, whether a list in the data format set 21 is empty is checked, and when there is no list in the data format set 21, notification of an processing error is performed at step S224 and the process is terminated. When a list is present in the data format set 21, the highest-precision format in the data format set 21 may be selected as a pivot format.

Here, at step S242, whether a format conversion plugin that supports an input data format and supports the pivot data format as output is present in the data format set 21 may be checked.

Here, at step S242, whether a format conversion plugin that receives the pivot data format as input and supports conversion into an output data format is present may be checked.

Here, the data format set 21 may be a list of plugins for performing conversion of training result data.

Here, the pivot data format may be a training result data format to be used in an intermediate stage of conversion, among training result data formats that support conversion.

Here, the format conversion plugin may correspond to a set comprising a plugin for receiving the pivot data format and converting the same into another data format and a plugin for receiving a data format that can be processed thereby and converting the same into the pivot data format.

At step S243, the data format set may be reconfigured.

That is, at step S243, the input data format conversion plugin and the output data format conversion plugin are selected, after which the output of the input data format conversion plugin may be connected to the input of the output data format conversion plugin.

Also, at step S244, through the connection of the plugins formed in the process of reconfiguring the data format set, quantization of the corresponding data format may be performed.

That is, a quantization process for converting a data format into another format may be performed through the data format conversion process at step S244.

Here, at step S244, a pivot data format is selected, and modules for performing quantization based on the pivot data format are provided in the form of plugins, whereby optimal lightening may be supported through application of multiple types of quantization algorithms.

Here, at step S244, a pivot data format for data conversion based on quantization is selected, and the data value of the training result data is quantized using the pivot data format, whereby conversion of the format of the training result data may be supported.

Figure 15:
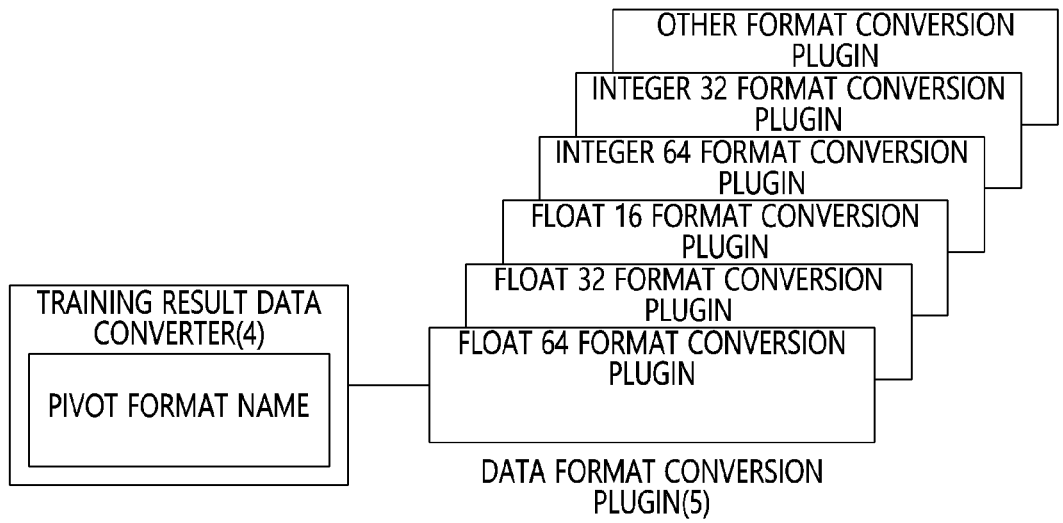
FIG. 15 is a view illustrating the process of converting training result data according to an embodiment of the present disclosure.

Here, at step S244, the quantized data generated through quantization of the data format may be stored in the training result data storage 17. FIG. 15 is a view illustrating the process of converting training result data according to an embodiment of the present disclosure.

Here, the quantized data may be the data that is converted through data format conversion.

Referring to FIG. 15, it can be seen that the training result data converter 4 performs quantization to a data format corresponding to the extracted element using the data format conversion plugin 5.

Figure 16:
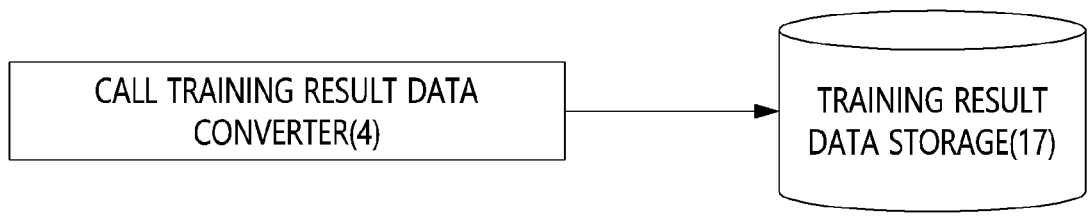
FIG. 16 is a view illustrating the process of storing training result data according to an embodiment of the present disclosure.

FIG. 16 is a view illustrating the process of storing training result data according to an embodiment of the present disclosure.

Referring to FIG. 16, the training result data converter 4 may store the quantized data generated through data format quantization in the training result data storage 17.

The format that can represent the highest precision in the target system is selected as the pivot format at the time of installation in the target system, and data format conversion plugins therefor may be installed in the target system.

Also, in the method for generating an executable image of a neural network according to an embodiment of the present disclosure, a neural network executable image may be generated at step S250.

That is, the converted neural network model, the converted training result data, the inference engine, and the accelerator library are combined, whereby a neural network executable image may be generated at step S250.

Figure 17:
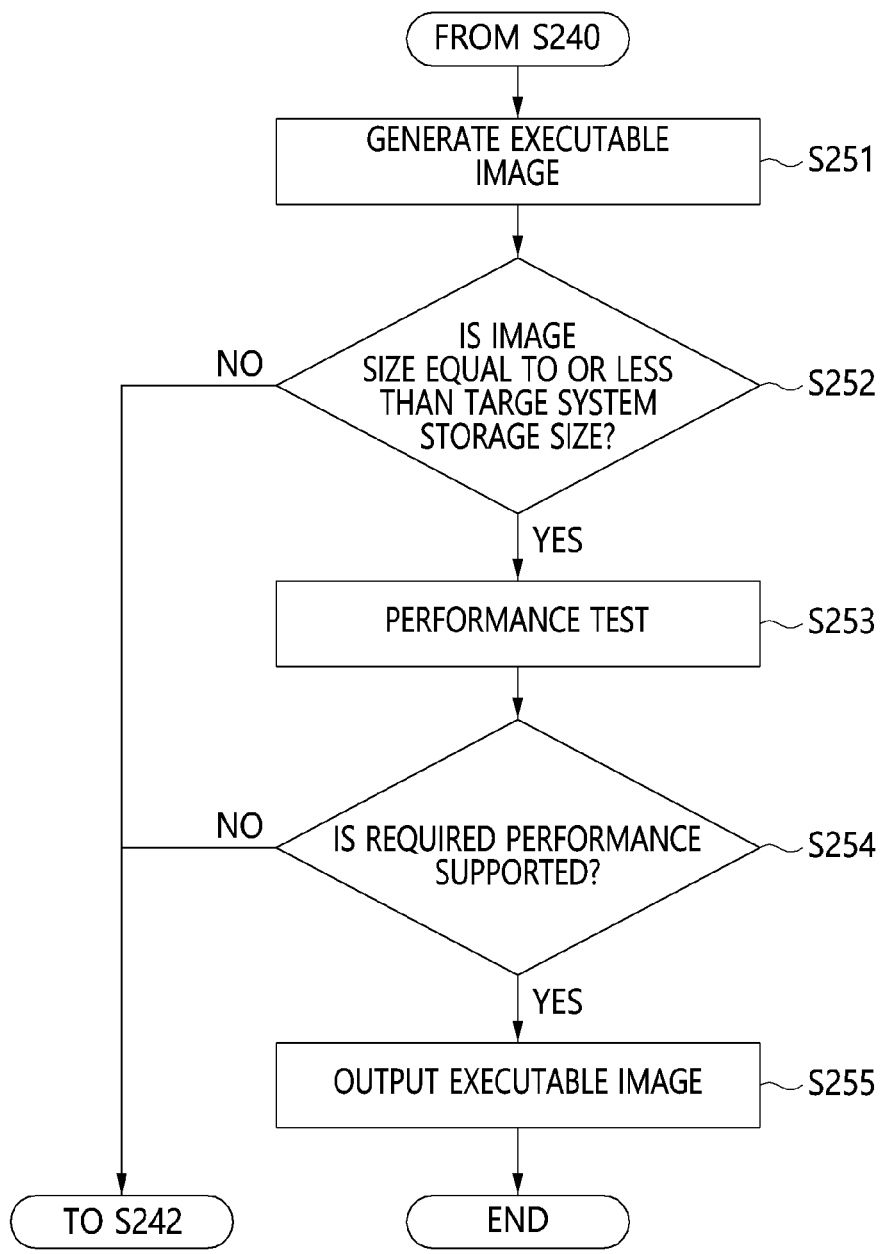
FIG. 17 is a flowchart illustrating in detail an example of the step of generating an executable image of a neural network, illustrated in FIG. 4.

FIG. 17 is a flowchart illustrating in detail an example of the step of generating a neural network executable image, illustrated in FIG. 4.

Here, at step S251, a neural network executable image may be generated by combining the neural network graph structure of the neural network model, the training result data, the inference engine, and the accelerator library.

Here, at step S251, the generated neural network executable image may be stored in the neural network executable image storage 20.

Figure 18:
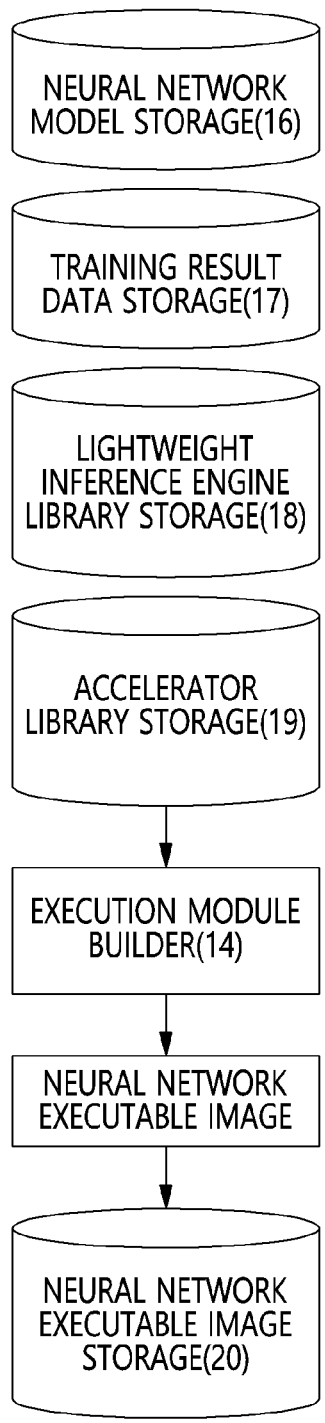
FIG. 18 is a view illustrating the process of generating an executable image according to an embodiment of the present disclosure.

FIG. 18 is a view illustrating the process of generating an executable image according to an embodiment of the present disclosure.

Referring to FIG. 18, it can be seen that the execution module builder 14 generates a neural network executable image by combining the neural network graph structure of the neural network model, the training result data, the inference engine, and the accelerator library.

Here, it can be seen that the execution module builder 14 stores the generated neural network executable image in the neural network executable image storage 20.

At step S252, whether the size of the generated neural network executable image is less than the storage size required by the user may be checked using the code image size checker 13.

Here, when it is determined at step S252 that the size of the neural network executable image is greater than the storage size required by the user, the list in the data format set is checked by going back to step S242. When the size of the neural network executable image is equal to or less than the storage size required by the user, a performance test may be performed at step S253.

At step S253, whether the performance required by the user is output may be checked through the performance test.

Here, at step S253, the neural network executable image is executed using the test data set included in the user requirements, and the performance test for analyzing the inference accuracy of the neural network executed for the test data set and a data-processing rate may be performed.

Here, the test data is included in the user requirements, and may include criteria for accuracy and data-processing rate.

When it is determined through the performance test at step S254 that the required performance corresponding to criteria for the accuracy and data-processing rate received as the user requirements is not satisfied, the list in the data format set is checked by going back to step S242, and when it is determined that the required performance is satisfied, the executable image may be output at step S255.

Here, at step S255, the neural network executable image stored in the neural network executable image storage 20 may be returned.

Figure 19:
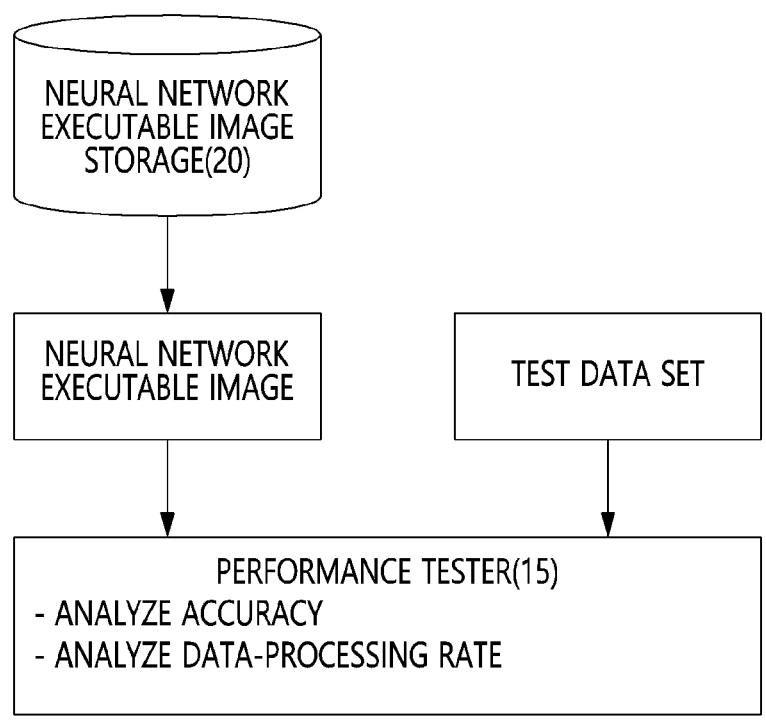
FIG. 19 is a view illustrating a performance test process according to an embodiment of the present disclosure.

FIG. 19 is a view illustrating a performance test process according to an embodiment of the present disclosure.

Referring to FIG. 19, it can be seen that the performance tester 15 executes the generated neural network executable image using the test data set, thereby analyzing the accuracy and data-processing rate for the test data.

Figure 20:
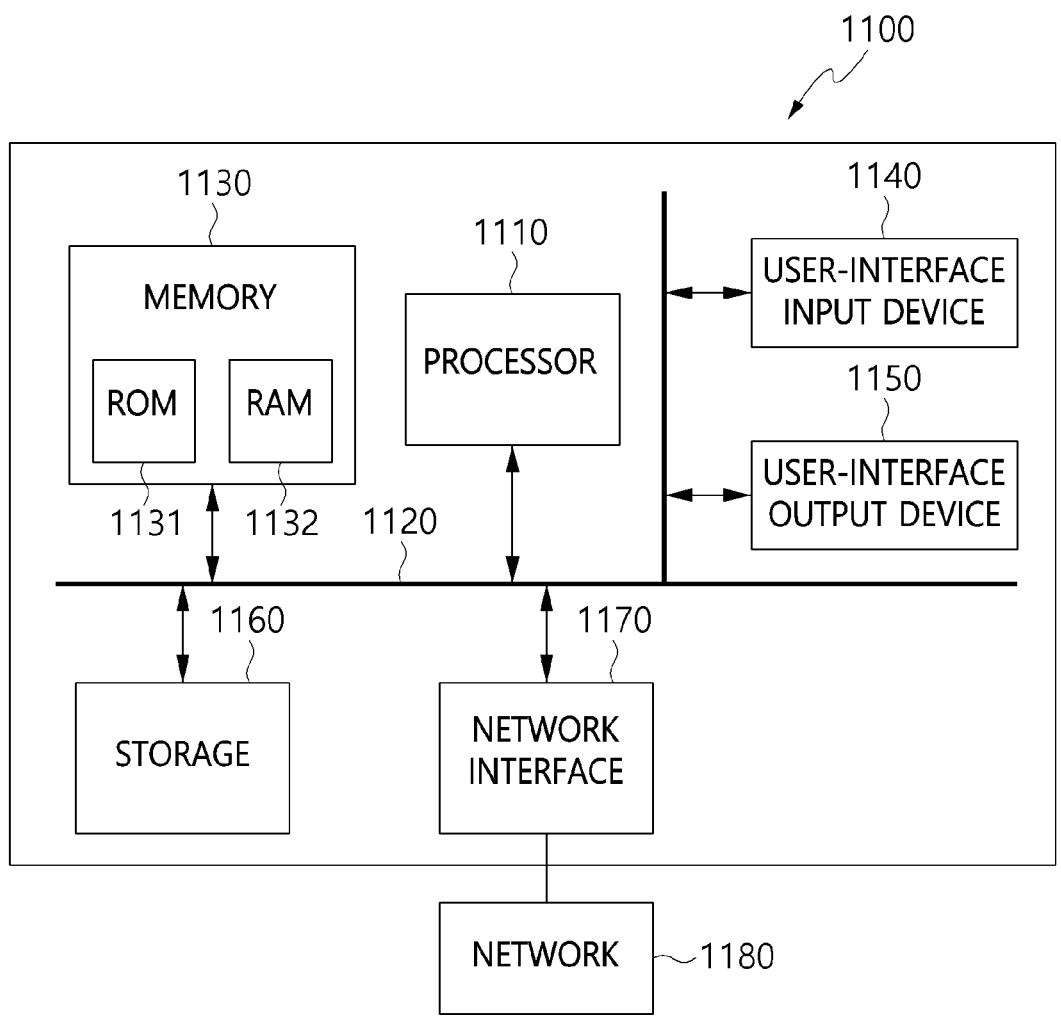
FIG. 20 is a view illustrating a computer system according to an embodiment of the present disclosure.

FIG. 20 is a view illustrating a computer system according to an embodiment of the present disclosure.

Referring to FIG. 20, the apparatus 100 for generating an executable image of a neural network according to an embodiment of the present disclosure may be implemented in a computer system 1100 including a computer-readable recording medium. As illustrated in FIG. 20, the computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 connected to a network 1180. The processor 1110 may be a central processing unit or a semiconductor device for executing processing instructions stored in the memory 1130 or the storage 1160. The memory 1130 and the storage 1160 may be any of various types of volatile or nonvolatile storage media. For example, the memory may include ROM 1131 or RAM 1132.

The apparatus for generating an executable image of a neural network according to an embodiment of the present disclosure includes one or more processors 1110 and executable memory 1130 for storing at least one program executed by the one or more processors 1110. The at least one program receives user requirements including a default neural network model and training result test data for generating a neural network executable image required by a user, checks whether the default neural network model included in the user requirements is capable of being supported in a target system in which the neural network executable image is to be installed, converts the default neural network model into a neural network model that is executable in the target system, converts the training result data by reconfiguring the data format set of the training result data, and generates a neural network executable image by combining the converted neural network model and the converted training result data.

Here, in order to check whether the default neural network model is capable of being supported in the target system, the at least one program may check whether a neural network model conversion plugin that supports the neural network graph representation format of the default neural network model and the data format of the training result data is present.

Here, the at least one program checks whether the accelerator type included in the user requirements is present in an accelerator library and identifies execution functions used by the inference engine included in the user requirements, thereby checking whether the default neural network model is capable of being supported in the target system.

Here, the at least one program may select a pivot model for neural network model conversion and form a neural network model conversion plugin, in which a function for two-way conversion between the selected pivot model and each neural network model is implemented for each neural network model.

Here, the at least one program may convert the default neural network model by checking whether the selected pivot model is the same type of model as the neural network model for inference engine in the target system.

Here, the at least one program may extract neural network functions used in the default neural network model, identify additional neural network functions called by the extracted neural network functions, and add the additional neural network functions as neural network functions for inference engine.

Here, the at least one program may select a pivot data format for data conversion based on quantization and quantize the data value of the training result data using the pivot data format, thereby reconfiguring the data format set of the training result data.

Here, the at least one program may check whether the size of the neural network executable image is equal to or less than the size of storage in the target system, and may perform a performance test in order to check whether the performance of the neural network executable image satisfies required performance of the user requirements.

Here, the at least one program may execute the neural network executable image using the test data set included in the user requirements, and may perform a performance test for analyzing the inference accuracy and the data-processing rate of the neural network executed for the test data set.

The present disclosure may lighten a neural network model and solve the problem of complexity in generation of a neural network executable image.

Also, the present disclosure may solve a problem of separately supporting a training engine and an inference engine of a neural network model, a problem of data conversion based on quantization, and a problem in which it is required to check available memory when a neural network is executed.

Also, the present disclosure may support implementation and use of a neural network engine and a converter for each data format, checking of memory by a user, and generation of a lightweight neural network executable image.

As described above, the apparatus and method for generating an executable image of a neural network according to the present disclosure are not limitedly applied to the configurations and operations of the above-described embodiments, but all or some of the embodiments may be selectively combined and configured, so the embodiments may be modified in various ways.

What is claimed is:

1. An apparatus for generating an executable image of a neural network, comprising:
one or more processors; and
executable memory for storing at least one program executed by the one or more processors,
wherein the at least one program is configured to:
receive user requirements including a default neural network model and training result data for generating a neural network executable image required by a user;
check whether the default neural network model included in the user requirements is capable of being supported in a target system in which the neural network executable image is to be installed;
convert the default neural network model into a neural network model that is executable in the target system;
convert the training result data by reconfiguring a data format set of the training result data;
generate a neural network executable image by combining the converted neural network model and the converted training result data;
wherein the at least one program is further configured to:
check whether a neural network model conversion plugin that supports a neural network graph representation format of the default neural network model and a data format of the training result data is present, in order to check whether the default neural network model is capable of being supported in the target system;
check whether an accelerator type included in the user requirements is present in an accelerator library and identifies execution functions used by an inference engine included in the user requirements, thereby checking whether the default neural network model is capable of being supported in the target system;
convert the default neural network model comprises selecting a pivot model for neural network model conversion;
form a neural network model conversion plugin in which a function for two-way conversion between the selected pivot model and each neural network model is implemented for each neural network model; and
converts the default neural network model by checking whether the selected pivot model is a same type of model as a neural network model for inference engine in the target system.

2. The apparatus of claim 1, wherein the at least one program extracts a neural network function used in the default neural network model, identifies an additional neural network function called by the extracted neural network function, and adds the additional neural network function as a neural network function for inference engine.

3. The apparatus of claim 1, wherein the at least one program selects a pivot data format for data conversion based on quantization and quantizes a data value of the training result data using the pivot data format, thereby reconfiguring the data format set of the training result data.

4. The apparatus of claim 1, wherein the at least one program checks whether a size of the neural network executable image is equal to or less than a size of storage of the target system and performs a performance test for checking whether performance of the neural network executable image satisfies required performance of the user requirements.

5. The apparatus of claim 4, wherein the at least one program executes the neural network executable image using a test data set included in the user requirements and performs a performance test for analyzing inference accuracy and a data-processing rate of a neural network executed for the test data set.

6. A method for generating an executable image of a neural network, performed by an apparatus for generating an executable image of a neural network, comprising:

receiving user requirements including a default neural network model and training result data for generating a neural network executable image required by a user;
checking whether the default neural network model included in the user requirements is capable of being supported in a target system in which the neural network executable image is to be installed;
converting the default neural network model into a neural network model that is executable in the target system;
converting the training result data by reconfiguring a data format set of the training result data; and
generating a neural network executable image by combining the converted neural network model and the converted training result data,
wherein:
checking whether the default neural network model is capable of being supported in the target system comprises checking whether a neural network model conversion plug-in that supports a neural network graph representation format of the default neural network model and a data format of the training result data is present in order to check whether the default neural network model is capable of being supported in the target system,
checking whether the default neural network model is capable of being supported in the target system comprises checking whether an accelerator type included in the user requirements is present in an accelerator library and identifying an execution function used by an inference engine included in the user requirements, thereby checking whether the default neural network model is capable of being supported in the target system,
converting the default neural network model comprises selecting a pivot model for neural network model conversion and forming a neural network model conversion plug-in in which a function for two-way conversion between the selected pivot model and each neural network model is implemented for each neural network model,
converting the default neural network model comprises converting the default neural network model by checking whether the selected pivot model is a same type of model as a neural network model for inference engine in the target system.

7. The method of claim 6, wherein converting the default neural network model comprises extracting a neural network function used in the default neural network model, identifying an additional neural network function called by the extracted neural network function, and adding the additional neural network function as a neural network function for inference engine.

8. The method of claim 6, wherein converting the training result data comprises selecting a pivot data format for data conversion based on quantization and quantizing a data value of the training result data using the pivot data format, thereby reconfiguring the data format set of the training result data.

9. The method of claim 6, wherein generating the neural network executable image comprises checking whether a size of the neural network executable image is equal to or less than a size of storage of the target system and performing a performance test for checking whether performance of the neural network executable image satisfies required performance of the user requirements.

10. The method of claim 9, wherein generating the neural network executable image comprises executing the neural network executable image using a test data set included in the user requirements and performing a performance test for analyzing inference accuracy and a data-processing rate of a neural network executed for the test data set.

* * * * *